United States Patent
Billich

(10) Patent No.: US 10,933,857 B2
(45) Date of Patent: Mar. 2, 2021

(54) METHOD FOR OPERATING AN INTERNAL COMBUSTION ENGINE WITH AN EXHAUST GAS AFTERTREATMENT DEVICE

(71) Applicant: Deere & Company, Moline, IL (US)

(72) Inventor: Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/574,950

(22) Filed: Sep. 18, 2019

(65) Prior Publication Data

US 2020/0094806 A1 Mar. 26, 2020

(30) Foreign Application Priority Data

Sep. 25, 2018 (DE) .............................. 102018216366

(51) Int. Cl.
| | | |
|---|---|---|
| *B60W 10/06* | (2006.01) | |
| *B60W 10/10* | (2012.01) | |
| *F01N 3/20* | (2006.01) | |

(52) U.S. Cl.
CPC ............ *B60W 10/06* (2013.01); *B60W 10/10* (2013.01); *F01N 3/208* (2013.01)

(58) Field of Classification Search
None
See application file for complete search history.

(56) References Cited

U.S. PATENT DOCUMENTS

| | | | | |
|---|---|---|---|---|
| 5,997,434 A | * | 12/1999 | Graf .................... | F16H 61/0213 477/98 |
| 6,352,490 B1 | * | 3/2002 | Makki .................. | B60W 30/18 477/78 |

(Continued)

FOREIGN PATENT DOCUMENTS

| | | |
|---|---|---|
| EP | 1247968 A2 | 10/2002 |
| EP | 3106638 A1 | 12/2016 |

OTHER PUBLICATIONS

European Search Report issued in counterpart European Patent Application No. 19198345.1 dated Mar. 19, 2020 (7 pages).

*Primary Examiner* — Dirk Wright
(74) *Attorney, Agent, or Firm* — Klintworth & Rozenblat IP LLP

(57) ABSTRACT

A method for operating an internal combustion engine with an exhaust gas aftertreatment device has a control system that determines a vector field of corresponding engine operating points ($n_{Eng}^i$, $M_{Eng}^i$) depending on a predetermined reducing agent-fuel consumption weighting $q_{FD}$ to be maintained during the operation of the internal combustion engine in order to derive a specific DEF-fuel consumption $BSFC^i$ for each of the engine operating points ($n_{Eng}^i$, $M_{Eng}^i$). The control system selects the element $i^{Set}$ from the identified vector field to which a minimum specific DEF-fuel consumption $BSFC^{Set}$ corresponds as the setpoint engine operating point ($n_{Eng}^{Set}$, $M_{Eng}^{Set}$), wherein the control system specifies a setpoint engine speed $n_{Eng}^{Set}$ according to the selected element $i^{Set}$ and specifies therefrom a setpoint gear ratio $r^{Set}$, taking into account a current gearbox output speed $n_{out}$.

11 Claims, 2 Drawing Sheets

(56) References Cited

U.S. PATENT DOCUMENTS

| | | | |
|---|---|---|---|
| 6,866,610 B2* | 3/2005 | Ito | F02D 11/105 |
| | | | 477/43 |
| 7,063,642 B1 | 6/2006 | Hu et al. | |
| 7,422,544 B2* | 9/2008 | Berglund | F16H 61/0213 |
| | | | 477/100 |
| 7,435,201 B2* | 10/2008 | Steen | F01N 3/2066 |
| | | | 477/98 |
| 7,591,130 B2* | 9/2009 | Ito | B60W 10/101 |
| | | | 60/277 |
| 7,861,518 B2* | 1/2011 | Federle | F01N 3/208 |
| | | | 60/286 |
| 8,073,610 B2* | 12/2011 | Heap | B60K 6/365 |
| | | | 701/102 |
| 8,577,568 B2* | 11/2013 | Sujan | F02D 41/1447 |
| | | | 701/64 |
| 8,790,219 B2* | 7/2014 | Yano | F01N 13/009 |
| | | | 477/100 |
| 9,103,248 B2* | 8/2015 | Light-Holets | F01N 3/208 |
| 9,458,605 B2* | 10/2016 | Hyodo | E02F 9/2296 |
| 9,657,667 B2* | 5/2017 | Stenlaas | B60W 10/11 |
| 10,352,256 B2* | 7/2019 | Stenlaas | F02D 29/02 |
| 2007/0079605 A1* | 4/2007 | Hu | F01N 3/103 |
| | | | 60/295 |
| 2009/0301451 A1* | 12/2009 | Ito | F02D 41/2422 |
| | | | 123/674 |
| 2013/0152549 A1 | 6/2013 | Light-Holets | |

\* cited by examiner

METHOD FOR OPERATING AN INTERNAL COMBUSTION ENGINE WITH AN EXHAUST GAS AFTERTREATMENT DEVICE

CROSS-REFERENCE TO RELATED APPLICATION(S)

This application claims priority to German application No. DE 102018216366, filed Sep. 25, 2018, which is incorporated herein in its entirety.

STATEMENT OF FEDERALLY SPONSORED RESEARCH OR DEVELOPMENT

Not applicable.

FIELD OF THE DISCLOSURE

The disclosure relates to a method for operating an internal combustion engine with an exhaust gas aftertreatment device.

BACKGROUND OF THE DISCLOSURE

In order to reduce harmful emissions from diesel-powered internal combustion engines, modern agricultural machinery generally comprises an exhaust gas aftertreatment device consisting of a soot particle filter and an SCR catalytic converter (SCR—Selective Catalytic Reduction). The SCR catalytic converter is used for catalytic reduction of nitrogen oxides contained in the exhaust gas. An aqueous urea solution (DEF—Diesel Exhaust Fluid) is injected into the exhaust gas stream as a reducing agent. The consumption ratio between diesel fuel and a urea solution ultimately depends on the operating point of the internal combustion engine and cannot be easily estimated by the driver in terms of the cost of consumption caused.

SUMMARY OF THE DISCLOSURE

In one aspect, the disclosure a method for operating an internal combustion engine with an exhaust gas aftertreatment device. The method includes receiving at a control system a reducing agent-fuel consumption weighting ($q_{FD}$) to be maintained during the operation of the internal combustion engine, wherein the reducing agent-fuel consumption weighting $q_{FD}$ is specified by an operator's control unit communicating with the control system. The method also includes determining by the control system a vector field of corresponding engine operating points ($n_{Eng}^i$, $M_{Eng}^i$) based on the reducing agent-fuel consumption weighting $q_{FD}$ in order to derive a specific reducing agent-fuel consumption $BSFC^i$ for each of the engine operating points ($n_{Eng}^i$, $M_{Eng}^i$), $$BSFC^i = \frac{\dot{m}_{Fuel}^i + \dot{m}_{DEF}^i \cdot q_{FD}}{P_{out}},$$

wherein $\dot{m}_{Fuel}^i$ represents a fuel consumption rate and $\dot{m}_{DEF}^i$ represents a reducing agent consumption rate for the ith engine operating point, $q_{FD}$ represents the reducing agent-fuel consumption weighting and $P_{out}$ represents a current gearbox output power. The method further includes selecting by the control system an element $i^{Set}$ from the vector field to which a minimum specific reducing agent-fuel consumption $BSFC^{Set}$ corresponds as a setpoint engine operating point ($n_{Eng}^{Set}$, $M_{Eng}^{Set}$), wherein a setpoint engine speed is specified by the control system based on the selected element $i^{Set}$ and from it a setpoint gear ratio $r^{Set}$ is specified while taking into account a current gearbox output speed $n_{out}$.

The details of one or more example embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
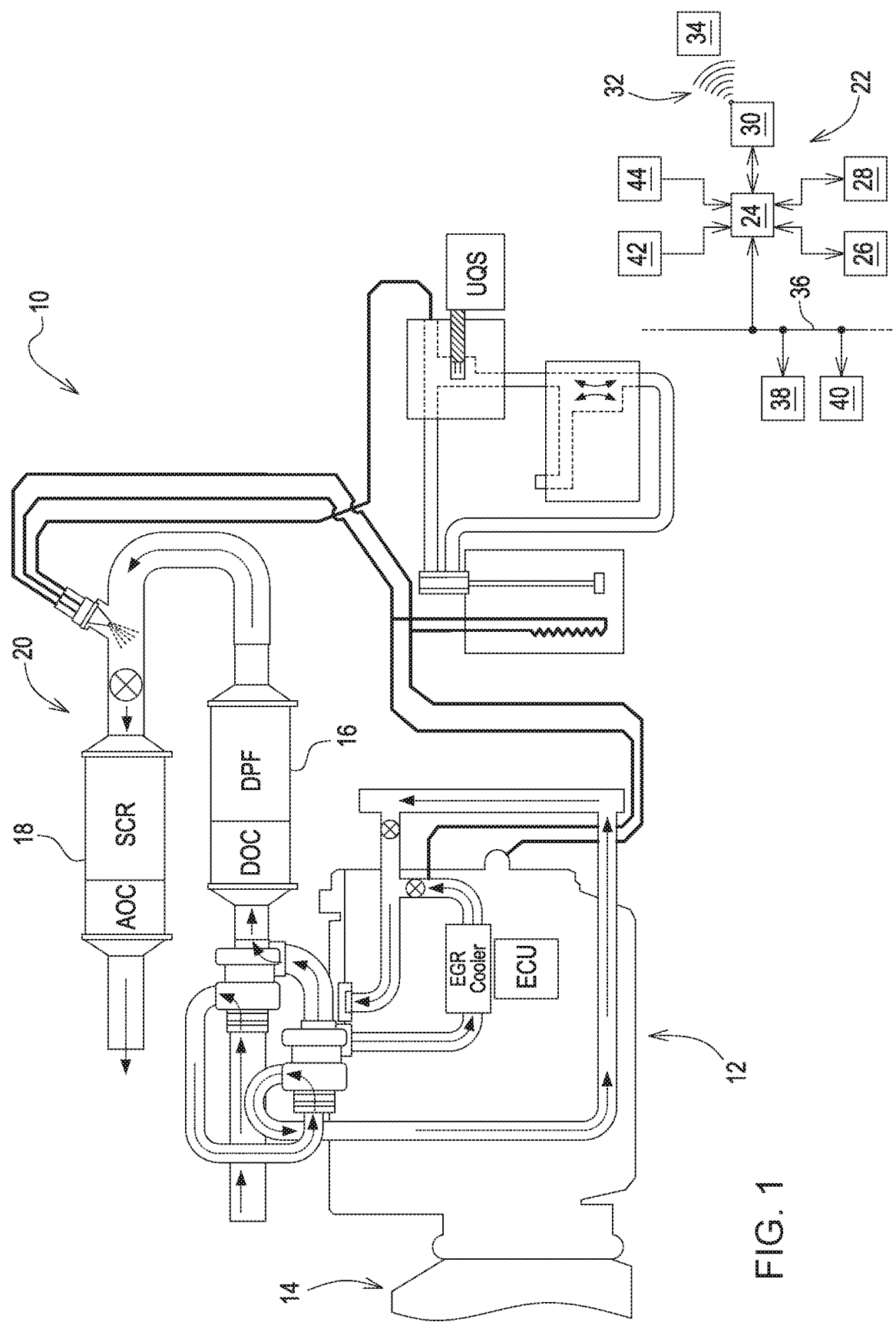
FIG. 1 shows a mobile vehicle system in the form of an agricultural tractor with a device for carrying out the method according to the disclosure.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

This disclosure may provide a method of the kind mentioned at the beginning in such a way that cost-optimized operation of the internal combustion engine is supported.

The method according to the disclosure for operating an internal combustion engine with an exhaust gas aftertreatment device provides that: (a) in a first step, a reducing agent-fuel consumption weighting ($q_{FD}$) to be maintained during the operation of the internal combustion engine is communicated to a control system, wherein the reducing agent-fuel consumption weighting $q_{FD}$ is specified by an operator's control unit communicating with the control system, (b) in a second step, the control system determines a vector field of corresponding engine operating points ($n_{Eng}^i$, $M_{Eng}^i$) based on the predetermined reducing agent-fuel consumption weighting $q_{FD}$ in order to derive a specific reducing agent-fuel consumption $BSFC^i$ for each of the engine operating points ($n_{Eng}^i$, $M_{Eng}^i$), $$BSFC^i = \frac{\dot{m}_{Fuel}^i + \dot{m}_{DEF}^i \cdot q_{FD}}{P_{out}},$$

wherein $\dot{m}_{Fuel}^i$ represents the fuel consumption rate and $\dot{m}_{DEF}^i$ represents the respective reducing agent consumption rate for the ith engine operating point, $q_{FD}$ represents the specified reducing agent-fuel consumption weighting and $P_{out}$ represents a current gearbox output power, and in a third step the control system selects from the identified vector field the element $i^{Set}$ to which a minimum specific reducing agent-fuel consumption $BSFC^{Set}$ corresponds as the setpoint engine operating point $(n_{Eng}^{Set}, M_{Eng}^{Set})$, wherein the control system specifies a setpoint engine speed $n_{Eng}^{Set}$ and therefrom a setpoint gearbox ratio $r^{Set}$, taking into account a current gearbox output revolution rate $n_{out}$.

In this way, it is possible to adjust the engine speed and gear ratio in the sense of a cost-optimized consumption ratio, taking into account the current fuel and reducing agent prices.

The internal combustion engine is usually diesel-powered, so that the fuel used is a diesel fuel and the reducing agent is an aqueous urea solution, such as AU32.

The method according to the disclosure can be used in particular for mobile vehicle systems from the commercial vehicle sector. These include, but are not limited to, agricultural, forestry or construction equipment of any kind.

The reducing agent-fuel consumption weighting $q_{FD}$ is defined as the ratio of consumption rates $\dot{m}_{DEF}$ and $\dot{m}_{Fuel}$ of the reducing agent and the fuel, $$q_{FD} = \dot{m}_{DEF}/\dot{m}_{Fuel}$$

A plurality of fixed reducing agent-fuel consumption weightings $q_{FD}$ can be specified by the control system for selection by the operator's control unit. In particular, a choice may be provided between three different values:

$$q_{FD} = 0:1, 1:1, 1:3$$

With a weighting of 0:1, only a fuel consumption, but not a reducing agent consumption, is taken into account in deriving the specific reducing agent-fuel consumption $BSFC^i$, whereas in the case of a weighting of 1:1, a consumption of reducing agent and fuel is calculated in equal parts. A value of 1:3 is also equivalent to a weighting in which there is a price-equivalent consumption of reducing agent and fuel, namely on the common assumption that the reducing agent is approximately three times as expensive as the same amount of fuel. By specifying a manageable number of fixed values for the reducing agent-fuel consumption weighting ($q_{FD}$), the choice for the driver is greatly simplified. Alternatively, a free choice can also be provided for suitably experienced drivers.

In order to determine the vector field, the control system can first determine an engine speed vector $\vec{n}_{Eng}$ for a permitted engine speed range $[n_{Eng}^{min}, n_{Eng}^{max}]$.

If the gearbox unit is a continuously variable gearbox, this can be carried out assuming N possible values for the engine speed, $$\vec{n}_{Eng} = (n_{Eng}^{min}, n_{Eng}^{min} + \Delta n \cdot i, \ldots, n_{Eng}^{max}) \cap \Delta n = \frac{n_{Eng}^{max} - n_{Eng}^{min}}{N} \; \forall \; i = 1 \ldots N.$$

This takes into account the fact that the influence of engine speed on the part of an engine control device is generally not continuous but takes place in discrete speed steps. The number N or the width $\Delta n$ of the speed steps is ultimately limited upwards or downwards by the computing capacity of the engine control device used.

If, on the other hand, a manual gearbox with at least two gear ratios is provided, it is advisable to derive the engine speed vector $\vec{n}_{Eng}$ from the available gearbox ratios $r_T^i$ of the manual gearbox. In component notation, this is expressed for the ith gearbox ratio as $$n_{Eng}^i = n_{out} r_T^i,$$

wherein $n_{out}$ represents the current gearbox output speed. The latter can be detected using a gearbox speed sensor, for example.

Based on a simplified approach, the current gearbox output power $P_{out}$ can be derived directly from a current engine output power $P_{Eng}$ provided by the internal combustion engine, $$P_{Out} = P_{Eng}$$

In this case, the current engine output power $P_{Eng}$ is given by $$P_{Eng} = M_{Eng} \frac{\pi}{30} n_{Eng},$$

wherein $M_{Eng}$ is the current engine torque and $n_{Eng}$ is the current engine speed. The current engine speed $n_{Eng}$ can be determined using an engine speed sensor, whereas the current engine torque $M_{Eng}$ is provided by the engine control unit based on the fuel injection amount. Alternatively, a torque sensor may be provided for this purpose.

This results in the engine torque vector $\vec{M}_{Eng}$ corresponding to the engine speed vector $\vec{n}_{Eng}$ in component notation $$M_{Eng}^i = \frac{P_{out}}{\frac{\pi}{30} n_{Eng}^i}.$$

On the other hand, the consumption rates $\dot{m}_{DEF}$ and $\dot{m}_{Fuel}$ of the reducing agent and the fuel at each of the possible engine operating points $(n_{Eng}, M_{Eng})$ of the internal combustion engine are known, $$\dot{m}_{DEF} = f\{n_{Eng}, M_{Eng}\},$$

$$\dot{m}_{Fuel} = f\{n_{Eng}, M_{Eng}\}.$$

These are stored in the form of appropriate tables in a memory unit assigned to the control system and, conversely, allow the specific reducing agent-fuel consumption $BSFC^i$ at the ith engine operating point $(n_{Eng}^i, M_{Eng}^i)$ to be derived.

The setpoint engine speed $n_{Eng}^{Set}$ and/or the setpoint gear ratio $r^{Set}$ prescribed according to the minimum specific reducing agent-fuel consumption $BSFC^{Set}$ can then be controlled by the control system in the internal combustion engine and/or in the gearbox unit. This can be carried out automatically, if necessary it may also be carried out by the driver by the operator's control unit after prior confirmation or approval.

In order to ensure operation of the internal combustion engine free of propulsion force interventions, it is possible that the vector field is adjusted by the control system with respect to those engine operating points $(n_{Eng}^i, M_{Eng}^i)$ that are located outside the torque potential of the internal combustion engine, wherein the selection of the element $i^{Set}$ corresponding to the minimum specific reducing agent-fuel consumption $BSFC^{Set}$ is adjusted by the control system on the basis of the adjusted vector field.

Furthermore, it is possible that the control system will determine a current specific reducing agent-fuel consumption $BSFC^c$, wherein control of the setpoint engine speed $n_{Eng}^{Set}$ and/or the setpoint gearbox ratio $r^{Set}$ only occurs if the control system determines that the current specific reducing agent-fuel consumption $BSFC^c$ exceeds the minimum specific reducing agent fuel consumption BSFC$^{Set}$ by a predetermined difference in consumption $\Delta_{BSFC}$, $$BSFC^c = BSFC i^{Set > \Delta BSFC},$$

with $$BSFC^c = \frac{\dot{m}^c_{Fuel} + \dot{m}^c_{DEF} \cdot q_{FD}}{P_{out}},$$

wherein $\dot{m}_{Fuel}$ and $\dot{m}_{DEF}$ represent the current fuel and reducing agent consumption rates in relation to the current engine operating point ($n_{Eng}$, $M_{Eng}$).

By suitably specifying the difference in consumption $\Delta_{BSFC}$, superfluous corrective interventions in the engine speed or the gear ratio due to only minor variations of the current specific reducing agent-fuel consumption BSFC$^c$ can be avoided. The consumption behavior or operating behavior of the internal combustion engine or gearbox unit is thus significantly improved.

In this context, it may also be provided that the control system will calculate a current engine power reserve $P_{Res}^c$ for the current engine operating point ($n_{Eng}$, $M_{Eng}$) and a setpoint engine performance reserve $P_{Res}^{Set}$ corresponding to the setpoint engine operating point ($n_{Eng}^{Set}$, $M_{Eng}^{Set}$), wherein control of the setpoint engine speed $n_{Eng}^{Set}$ and/or the setpoint gear ratio $r^{Set}$ is only carried out if the setpoint engine power reserve $P_{Res}^{Set}$ exceeds the current engine power reserve $P_{Res}^c$ by a predetermined power difference $\Delta p$, $$P_{Res}^{Set} - P_{Res}^c > \Delta_P,$$

with $$P_{Res}^c = (M_{Eng}^{Max}\{n_{Eng}\} - M_{Eng})\frac{\pi}{30} n_{Eng},$$

$$P_{Res}^{Set} = (M_{Eng}^{Max}\{n_{Eng}^{Set}\} - M_{Eng}^{Set})\frac{\pi}{30} n_{Eng}^{Set},$$

wherein $M_{Eng}^{Max}\{n_{Eng}\}$ or $M_{Eng}^{Max}\{n_{Eng}^{Set}\}$ represents the maximum torque potential of the combustion engine at the engine revolution rate $n_{Eng}$ or $n_{Eng}^{Set}$.

Thus, a corrective intervention in the engine speed or the gear ratio on the part of the control system is only carried out if it leads to a noticeable benefit in terms of the achievable power output.

Furthermore, performance losses occurring within the gearbox unit can be taken into account in order to accurately determine the current gearbox output power by the control system correcting the minimum specific reducing agent-fuel consumption BSFC$^{Set}$ depending on an efficiency $\eta_T^F$ or $\eta_T^R$ determined for the gearbox unit, wherein this arises as a function of a current gearbox input power $P_{in}$ or the current gearbox output power $P_{out}$ and the current engine speed $n_{Eng}$ and the current gear ratio $r_T$, $$\eta_T^F = f_T^F \{n_{Eng}, P_{in}, r_T\},$$

$$\eta_T^R = f_T^R \{n_{Eng}, P_{out}, r_T\}.$$

The functions $f_T^F$ or $f_T^R$ are stored in the memory unit assigned to the control system in the form of corresponding tables in this case.

The accuracy when determining the current gearbox output power $P_{out}$ can be further increased if the identified minimum specific reducing agent-fuel consumption BSFC$^{Set}$ is corrected by the control system depending on a torque component $M_{loss}$ that is due to a power demand of auxiliary units powered by the internal combustion engine. Said auxiliary units include, but are not limited to, electrical generators, hydraulic pumps, fan units and the like. The corresponding torque component is to a first approximation a function of the current engine speed $n_{Eng}$, $$M_{loss} = f_{Aux}\{n_{Eng}\}.$$

Accordingly, the simplified $P_{out} = P_{Eng}$ approach can be replaced by $$P_{out} = (M_{Eng} - M_{loss})\frac{\pi}{30} n_{Eng} \eta_T^F.$$

This, in turn, results in the appropriately corrected engine torque vector $\vec{M}_{Eng}$ in component notation $$M_{Eng}^i = \frac{P_{out}}{\frac{\pi}{30} n_{Eng} n_T^F \{n_{Eng}^i, P_{out}, r_T^i\}} + M_{loss}\{n_{Eng}^i\}.$$

In order to reduce computational effort, it may be provided that the setpoint engine speed $n_{Eng}^{Set}$ as well as the setpoint gear ratio $r^{Set}$ are calculated by the control system as a set of points for an interval ($P_{out}^{min}$, ..., $P_{out}^{max}$) specified for the current gearbox output power $P_{out}$ and stored in the memory unit as a control curve as a function of the current gearbox output power $P_{out}$. In this case, the calculation by the control system is to be carried out only once and can be carried out in particular in the factory.

The setpoint engine speed $n_{Eng}^{Set}$ and/or the setpoint gear ratio $r^{Set}$ arising from the control curve as a function of the current gearbox output power $P_{out}$ can then be controlled in the internal combustion engine and/or in the gearbox unit by the control system automatically or if necessary by the driver by the operator's control unit after prior confirmation or approval.

It is also conceivable that the calculation of the setpoint engine speed $n_{Eng}^{Set}$ as well as the setpoint gear ratio $r^{Set}$ is carried out statically by the control system in the form of the control curve and is transmitted via a data communication device to a memory unit contained in a mobile vehicle system, such as an agricultural, forestry or construction machine. The data communication device may be designed to connect wirelessly to a central data and computing server contained in the control system, wherein the control curve is provided by the central data and computing server and is uploaded to the memory unit.

FIG. 1 shows a mobile vehicle system in the form of a schematically displayed agricultural tractor with a device for carrying out the method according to the disclosure.

The agricultural tractor 10 comprises a diesel-powered internal combustion engine 12 as well as a gearbox unit 14 downstream of the internal combustion engine 12. The gearbox unit 14 is a continuously variable gearbox or a manual gearbox with at least two gear ratios. In order to reduce the harmful emissions of the internal combustion engine 12, an exhaust gas aftertreatment device 20 consisting of a soot particle filter 16 and an SCR catalytic converter 18 is also provided. The SCR catalytic converter 18 is used for the catalytic reduction of nitrogen oxides contained in the exhaust gas. An aqueous urea solution, such as EU 32, is used as a reducing agent.

The device 22 provided in the agricultural tractor 10 comprises an electronic control system 24, a memory unit 26 assigned thereto and an operator's control unit 28 embodied as a touch-sensitive display interface. A data communication device 30 allows the establishment of a wireless WLAN connection 32 to a central data and computing server 34.

Furthermore, the control system 24 is connected via a CAN data bus 36 to an engine control unit 38 and a gearbox controller 40 of the agricultural tractor 10, so that the control system 24 is able to carry out a driver-independent adjustment of the engine speed and the gear ratio.

A gearbox speed sensor 42 or an engine speed sensor 44 is used to detect a current gearbox output speed $n_{out}$ or a current engine speed $n_{Eng}$. The speed signals generated by the sensors 42, 46 are fed to the control system 24 for analysis.

Figure 2:
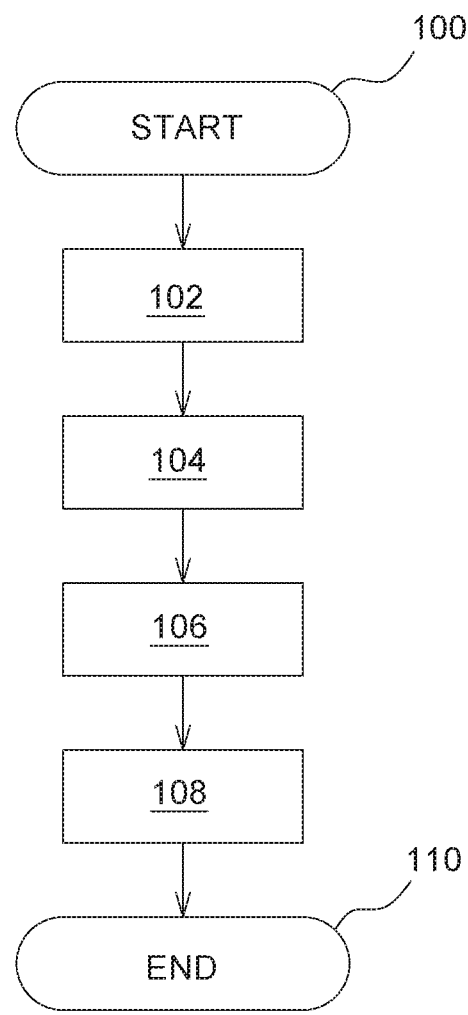
FIG. 2 shows an example of the method according to the disclosure in the form of a simplified flow diagram.

FIG. 2 shows an exemplary embodiment of the method according to the disclosure carried out by the device 22 and represented in the form of a simple flow diagram.

The method is initialized in a starting step 100 with commissioning the agricultural tractor 10. Then, in a first step 102 the driver is asked via the display interface included in the operator's control unit 28 to provide a reducing agent-fuel fuel consumption weighting ($q_{FD}$) to be observed during the operation of the internal combustion engine 12. The specification carried out by the driver by the operator's control unit 28 is then communicated to the control system 24.

The reducing agent-fuel consumption weighting $q_{FD}$ is defined as the ratio of the consumption rates of the reducing agent and the fuel, $$q_{FD} = \frac{\overset{v}{m}_{DEF}}{\overset{v}{m}_{Fuel}}.$$

In the present case, the control system 24 specifies in the first step 102 several fixed reducing agent-fuel consumption weightings ($q_{FD}$) for selection by the operator's control unit 28. There is a choice between three different values:

$$q_{FD}=0:1,1:1,1:3$$

In the case of a weighting of 0:1, only a fuel consumption, but not a reducing agent consumption, is taken into account, whereas in the case of a weighting of 1:1 a reducing agent consumption and a fuel consumption are applied in equal parts. A value of 1:3 is also equivalent to a weighting in which there is a price-equivalent consumption of reducing agents and fuel, namely on the common assumption that the reducing agent is approximately three times as expensive as the same amount of fuel. By specifying a manageable number of fixed values for the reducing agent-fuel consumption weighting ($q_{FD}$), the choice for the driver is greatly simplified. Alternatively, a free choice by the operator's control unit 28 is provided in the case of suitably experienced drivers.

In a second step 104 following the first step 102, a vector field of corresponding engine operating points will be determined by the control system 24 based on the specified reducing agent-fuel consumption weighting $q_{FD}$ with the aim of deriving a specific reducing agent-fuel consumption $BSFC^i$ for each of the engine operating points ($n_{Eng}^i$, $M_{Eng}^i$), $$BSFC^i = \frac{\dot{m}_{Fuel}^i + \dot{m}_{DEF}^i \cdot q_{FD}}{P_{out}}. \quad (1)$$

In this case, $\dot{m}_{Fuel}^i$ represents the fuel consumption rate and $\dot{m}_{DEF}^i$ represents the reducing agent consumption rate for the ith engine operating point, $q_{FD}$ represents the predetermined reducing agent-fuel consumption weighting and $P_{out}$ represents a current gearbox output power.

To determine the vector field, in the second step 104 the control system 24 first determines an engine speed vector $\vec{n}_{Eng}$ for an admissible engine speed range [$n_{Eng}^{min}$, $n_{Eng}^{max}$].

If the gearbox unit 14 is a continuously variable gearbox, the above is carried out under the assumption of N possible values for the engine speed, $$\vec{n}_{Eng} = (n_{Eng}^{min}, n_{Eng}^{min} + \Delta n \cdot i, \ldots, n_{Eng}^{max}) \cap \Delta n = \frac{n_{Eng}^{max} - n_{Eng}^{min}}{N} \forall i = 1 \ldots N.$$

This takes into account the fact that the influence of engine speed on the part of the engine control device 38 is generally not continuous, but in discrete speed steps. The number N or the width $\Delta n$ of the speed steps is ultimately limited upwards or downwards by the computing capacity of the engine control device 38 used.

If, on the other hand, a manual gearbox with at least two gear ratios is provided, the engine speed vector $\vec{n}_{Eng}$ will be derived from the available gear ratios $r_T^i$ of the manual gearbox. In component notation, this is expressed as follows for the ith gear ratio $$n_{Eng}^i = n_{out} r_T^i,$$

wherein the current gearbox output speed $n_{out}$ results from the speed signals provided by the gearbox speed sensor 42.

Two different approaches are now provided for the derivation of the current gearbox output power $P_{out}$.

Based on a simplified approach, in the second step 104 the current gearbox output power $P_{out}$ is derived directly from a current engine output power $P_{Eng}$ provided by the internal combustion engine 12, $$P_{out} = P_{Eng}.$$

The current engine output power $P_{Eng}$ is given by $$P_{Eng} = M_{Eng} \frac{\pi}{30} n_{Eng},$$

wherein $M_{Eng}$ is the current engine torque and $n_{Eng}$ is the current engine speed. The current engine speed $n_{Eng}$ is determined using the engine speed sensor 44, whereas the current engine torque $M_{Eng}$ is provided by the engine control device 38 based on the amount of fuel injected. Alternatively, a torque sensor (not shown in FIG. 1) may be provided for this purpose.

For the engine torque vector $\vec{M}_{Eng}$, which corresponds to the engine speed vector $\vec{n}_{Eng}$, this results in component notation in $$M_{Eng}^i = \frac{P_{out}}{\frac{\pi}{30}n_{Eng}^i}.$$

In order to ensure operation of the internal combustion engine 12 free from propulsion force interventions, in a second step 104 the determined vector field is adjusted by the control system 24 with respect to those engine operating points ($n_{Eng}^i$, $M_{Eng}^i$) that are outside the torque potential of the internal combustion engine 12.

In addition, the consumption rates $\dot{m}_{DEF}$ and $\dot{m}_{Fuel}$ of the reducing agent and the fuel are known for each of the possible engine operating points ($n_{Eng}$, $M_{Eng}$) of the internal combustion engine 12, $$\dot{m}_{DEF} = f\{n_{Eng}, M_{Eng}\},$$

$$\dot{m}_{Fuel} = f\{n_{Eng}, M_{Eng}\}.$$

These are stored in the form of corresponding tables in the memory unit 26 assigned to the control system 24. The control system 24 derives a corresponding specific reducing agent-fuel consumption $BSFC^i$ for each of the engine operating points ($n_{Eng}^i$, $M_{Eng}^i$) located within the adjusted vector field in the second step 104. Then, in a third step 106 following the second step 104, the control system 24 selects that element $i^{Set}$ as the setpoint engine operating point ($n_{Eng}^{Set}$, $M_{Eng}^{Set}$) to which a minimum specific reducing agent-fuel consumption $BSFC^{Set}$ corresponds, wherein the control system 24 specifies a setpoint engine speed $n^{set}$ in accordance with the selected element $i^{set}$ and specifies a setpoint gear ratio $r^{Set}$ from this, taking into account a current gearbox output speed $n_{out}$.

In a fourth step 108 following the third step 106, the setpoint engine speed $n_{Eng}^{Set}$ and/or the setpoint gear ratio $r^{Set}$ corresponding to the minimum specific reducing agent-fuel consumption $BSFC^{Set}$ is then controlled by the control system 24 in the internal combustion engine 12 and/or in the gearbox unit 14. This is carried out automatically, if necessary also by the driver by the operator's control unit 28 after prior confirmation and approval.

As an option, instead of the simplistic assumption $P_{Out} = P_{Eng}$, a more comprehensive approach is taken, in which power losses occurring within the gearbox unit 14 are taken into account in order to accurately determine the current gearbox output power $P_{Out}$. For this purpose, the identified minimum specific reducing agent-fuel consumption $BSFC^{Set}$ is corrected by the control system 24 depending on an efficiency $\eta_T^F$ or $\eta_T^R$ determined for the gearbox unit 14, wherein this arises as a function of a current gearbox input power $P_{in}$ or the current gearbox output power $P_{out}$, the current engine speed $n_{Eng}$ and the current gear ratio $r_T$, $$\eta_T^F = f_T^F\{n_{Eng}, P_{in}, r_T\}$$

$$\eta_T^R = f_T^R\{n_{Eng}, P_{out}, r_T\}.$$

Here, the functions $f_T^F$ or $f_T^R$ are stored in the form of corresponding tables in the memory unit 26 assigned to the control system 24.

The accuracy in determining the current gearbox output power $P_{out}$ can be further increased by the control system 24 correcting the identified minimum specific reducing agent-fuel consumption $BSFC^{Set}$ as a function of a torque component $M_{loss}$, which is due to a power demand of auxiliary units powered by the internal combustion engine 12. Said auxiliary units include, but are not limited to, electrical generators, hydraulic pumps, fan units and the like. To a first approximation, the corresponding torque component is a function of the current engine speed $n_{Eng}$, $$M_{loss} = f_{Aux}\{n_{Eng}\}.$$

Accordingly, the simplified $P_{out} = P_{Eng}$ approach is replaced by $$P_{out} = (M_{Eng} - M_{loss})\frac{\pi}{30}n_{Eng}\eta_T^F.$$

From this, in turn, the appropriately corrected engine torque vector $\vec{M}_{Eng}$ results, in component notation $$M_{Eng}^i = \frac{P_{out}}{\frac{\pi}{30}n_{Eng}\eta_T^F\{n_{Eng}^i, P_{out}, r_T^i\}} + M_{loss}\{n_{Eng}^i\}.$$

Furthermore, in the third step 106 the control system 24 determines a current specific reducing agent fuel-consumption $BSFC^c$. In the fourth step, control of the setpoint engine speed $n_{Eng}^{Set}$ and/or setpoint gear ratio $r^{Set}$ 108 only takes place if the control system 24 determines that the current specific reducing agent-fuel consumption $BSFC^c$ exceeds the minimum specific reducing agent-fuel consumption $BSFC^{Set}$ by a predetermined consumption difference $\Delta_{BSFC}$, $$BSFC^c - BSFC^{iSet} > \Delta_{BSFC},$$

with $$BSFC^c = \frac{\dot{m}_{Fuel}^c + \dot{m}_{DEF}^c \cdot q_{FD}}{P_{out}},$$

wherein $\dot{m}_{Fuel}$ and $\dot{m}_{DEF}$ represent the current fuel and reducing agent consumption rates in relation to the current engine operating point ($n_{Eng}$, $M_{Eng}$).

By suitably specifying the difference in consumption $\Delta_{BSFC}$, superfluous corrective interventions in engine speed or gear ratio that are due to only minor variations of the current specific reducing agent-fuel consumption $BSFC^c$ can be avoided. The consumption behavior or the operating behavior of the internal combustion engine 12 or gearbox unit 14 is thus significantly improved.

In addition, in the third step 106 it is provided that the control system 24 calculates a current engine power reserve $P_{Res}^c$ for the current engine operating point ($n_{Eng}$, $M_{Eng}$) and a setpoint engine power reserve $P_{Res}^{Set}$ corresponding to the setpoint engine operating point ($n_{Eng}^{Set}$, $M_{Eng}^{Set}$), wherein control of the setpoint engine speed $n_{Eng}^{Set}$ or the setpoint gear ratio $r^{Set}$ is only carried out if the setpoint engine power reserve $P_{Res}^{Set}$ exceeds the current engine power reserve $P_{Res}^c$ by a predetermined power difference $\Delta p$, $$P_{Res}^{Set} - P_{Res}^c > \Delta_P,$$

with $$P_{Res}^c = (M_{Eng}^{Max}\{n_{Eng}\} - M_{Eng})\frac{\pi}{30}n_{Eng},$$

-continued $$P_{Res}^{Set} = (M_{Eng}^{Max}\{n_{Eng}^{Set}\} - M_{Eng}^{Set})\frac{\pi}{30}n_{Eng}^{Set},$$

wherein $M_{Eng}^{Max}\{n_{Eng}\}$ or $M_{Eng}^{Max}\{n_{Eng}^{Set}\}$ represents the maximum torque potential of the internal combustion engine 12 for the engine speed $n_{Eng}$ or $n_{Eng}^{Set}$.

Thus, a corrective intervention in the engine speed or the gear ratio on the part of the control system 24 takes place only if it leads to a noticeable benefit in terms of the achievable power yield.

The procedure is then terminated in a final step 110.

According to a modification of the method according to the disclosure, to reduce the amount of computational effort the setpoint engine speed $n_{Eng}^{Set}$ and the setpoint gear ratio $r^{set}$ are calculated by the control system 24 in the second step 104 based on equation (1) as a set of points for an interval $(P_{out}^{min}, \ldots, P_{out}^{max})$ specified for the current gearbox output power $P_{out}$ and stored as a control curve in the memory unit 26 as a function of the current gearbox output power $P_{out}$. In this case, the calculation is to be carried out by the control system only once and can be carried out in particular in the factory.

Optionally the calculation of the setpoint engine speed $n_{Eng}^{Set}$ as well as the setpoint gear ratio $r^{Set}$ in the form of the control curve is carried out outside the agricultural tractor 10 by a static computational unit—here in the form of the central data and computing server 26 functionally contained in the control system 24—and transmitted via the data communication device 30 to the memory unit 26 contained in the agricultural tractor 10. The control curve is uploaded to the memory unit 26 via the WLAN connection 32 by the central data and computing server 34.

The rest of the procedure remains unchanged, so that reference is made to the associated description in this respect. In particular, here too in the fourth step 108 the setpoint engine speed $n_{Eng}^{Set}$ and/or the setpoint gear ratio $r^{Set}$ resulting from the control curve as a function of the current gearbox output power $P_{out}$ will be automatically controlled in the internal combustion engine and/or in the gearbox unit by the control system or if necessary will be controlled by the driver by the operator's control unit after prior confirmation or approval.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method for operating an internal combustion engine with an exhaust gas aftertreatment device, comprising:
   receiving at a control system a reducing agent-fuel consumption weighting ($q_{FD}$) to be maintained during the operation of the internal combustion engine, wherein the reducing agent-fuel consumption weighting $q_{FD}$ is specified by an operator's control unit communicating with the control system;
   determining by the control system a vector field of corresponding engine operating points ($n_{Eng}^i$, $M_{Eng}^i$) based on the reducing agent-fuel consumption weighting $q_{FD}$ in order to derive a specific reducing agent-fuel consumption $BSFC^i$ for each of the engine operating points ($n_{Eng}^i$, $M_{Eng}^i$), $$BSFC^i = \frac{\dot{m}_{Fuel}^i + \dot{m}_{DEF}^i \cdot q_{FD}}{P_{out}},$$

wherein $\dot{m}_{Fuel}^i$ represents a fuel consumption rate and $\dot{m}_{DEF}^i$ represents a reducing agent consumption rate for the ith engine operating point, $q_{FD}$ represents the reducing agent-fuel consumption weighting and $P_{out}$ represents a current gearbox output power; and
   selecting by the control system an element $i^{Set}$ from the vector field to which a minimum specific reducing agent-fuel consumption $BSFC^{Set}$ corresponds as a setpoint engine operating point ($n_{Eng}^{Set}$, $M_{Eng}^{Set}$), wherein a setpoint engine speed is specified by the control system based on the selected element $i^{Set}$ and from it a setpoint gear ratio $r^{Set}$ is specified while taking into account a current gearbox output speed $n_{out}$.

2. The method of claim 1, wherein the control system specifies a plurality of the reducing agent-fuel consumption weightings ($q_{FD}$) for selection by the operator's control unit.

3. The method of claim 1, wherein one or more of the setpoint engine speed $n_{Eng}^{Set}$ and the setpoint gear ratio $r^{Set}$ specified in accordance with the minimum specific reducing agent-fuel consumption $BSFC^{Set}$ is controlled by the control system in one or more of the internal combustion engine and the gearbox unit.

4. The method of claim 1, wherein the vector field is adjusted by the control system regarding the engine operating points ($n_{Eng}^i$, $M_{Eng}^i$) that lie outside the torque potential of the internal combustion engine; and
   wherein the selection of the element $i^{Set}$ corresponding to the minimum specific reducing agent-fuel consumption $BSFC^{Set}$ is carried out by the control system based on the adjusted vector field.

5. The method of claim 1, wherein a current specific reducing agent fuel-consumption $BSFC^c$ is determined by the control system; and
   wherein control of one or more of the setpoint engine speed $n_{Eng}^{Set}$ and the setpoint gear ratio $r^{Set}$ is only carried out if the control system determines that the current specific reducing agent-fuel consumption $BSFC^c$ exceeds the minimum specific reducing agent-fuel consumption $BSFC^{Set}$ by a predetermined difference in consumption $\Delta_{BSFC}$.

6. The method of claim 1, wherein the control system calculates a current engine power reserve $P_{Res}^c$ for a current engine operating point ($n_{Eng}$, $M_{Eng}$) and a setpoint engine power reserve $P_{Res}^{Set}$ corresponding to the setpoint engine operating point ($n_{Eng}^{Set}$, $M_{Eng}^{Set}$); and wherein control of one or more of the setpoint engine speed $n_{Eng}^{Set}$ and the setpoint gear ratio $r^{Set}$ is only carried out if the setpoint engine power reserve $P_{Res}^{Set}$ exceeds the current engine power reserve $P_{Res}^{c}$ by a predetermined power difference $\Delta p$.

7. The method of claim 1, wherein the determined minimum specific reducing agent-fuel consumption $BSFC^{Set}$ is corrected by the control system as a function of an efficiency $\eta_T^F$, $\eta_T^R$ determined for the gearbox unit.

8. The method of claim 1, wherein the determined minimum specific reducing agent-fuel consumption $BSFC^{Set}$ is corrected by the control system as a function of a torque component $M_{loss}$ due to a power demand of auxiliary units powered by the internal combustion engine.

9. The method of claim 1, wherein the setpoint engine speed $n_{Eng}^{Set}$ and the setpoint gear ratio $r^{Set}$ are calculated by the control system as a set of points for an interval $(P_{out}^{min}, \ldots, P_{out}^{max})$ specified for a current gearbox output power $P_{out}$ and are stored in a memory unit as a control curve as a function of the current gearbox output power $P_{out}$.

10. The method of claim 9, wherein one or more of the setpoint engine speed $n_{Eng}^{Set}$ and the setpoint gear ratio $r^{Set}$ resulting from the control curve as a function of the current gearbox output power $P_{out}$ are controlled by the control system in one or more of the internal combustion engine and the gearbox unit.

11. The method of claim 9, wherein the calculation of the setpoint engine speed $n_{Eng}^{Set}$ and the setpoint gear ratio $r^{Set}$ in the form of the control curve is carried out statically by a computational unit contained in the control system and is transmitted via a data communication device to the memory unit contained in a mobile vehicle system.

* * * * *